April 1, 1958     G. A. LYON     2,828,838
SHEET METAL ARTICLE WITH LOUVERS
Filed Sept. 27, 1952     2 Sheets-Sheet 1
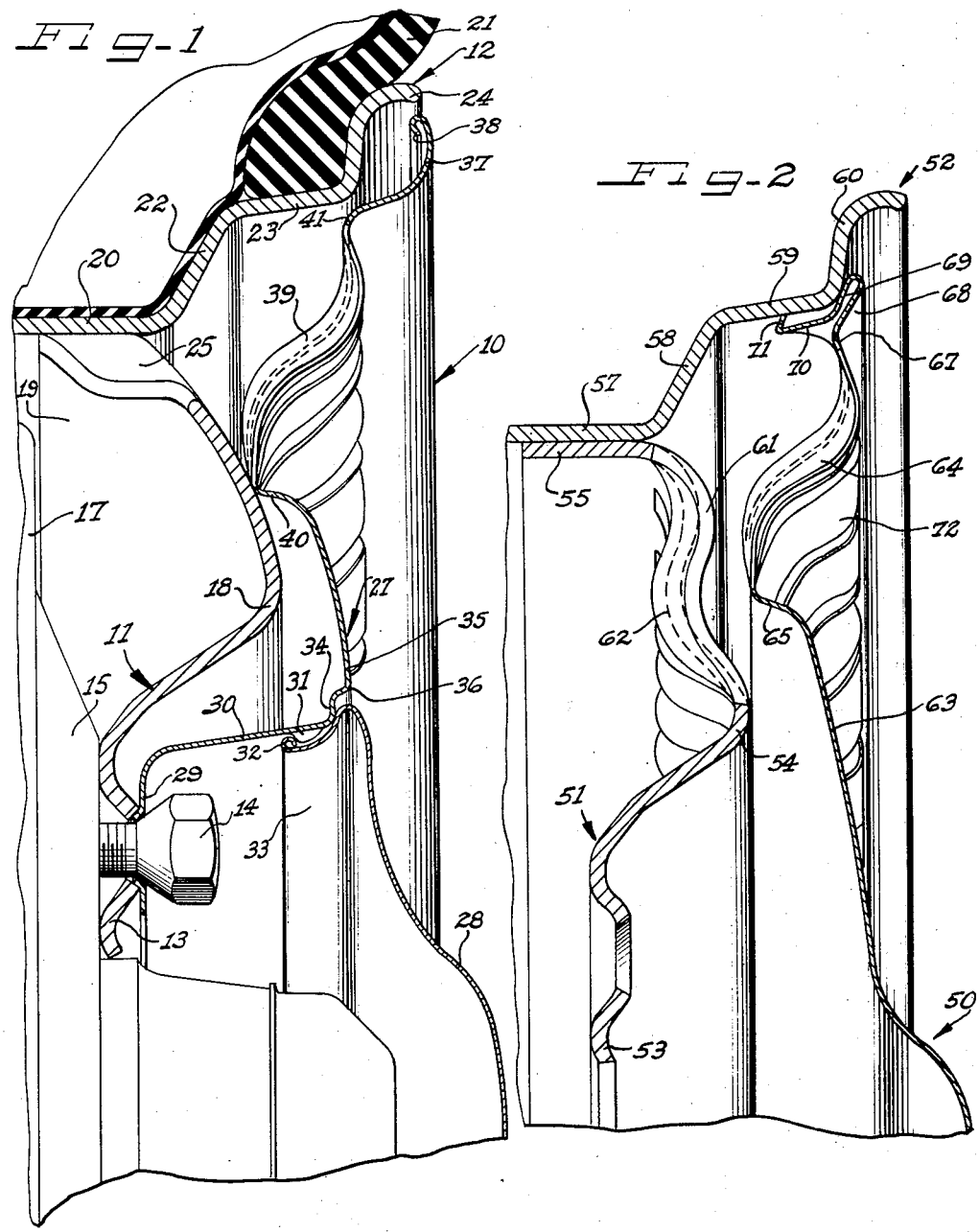
Inventor
George Albert Lyon
by    Attys April 1, 1958 G. A. LYON 2,828,838
SHEET METAL ARTICLE WITH LOUVERS
Filed Sept. 27, 1952 2 Sheets-Sheet 2
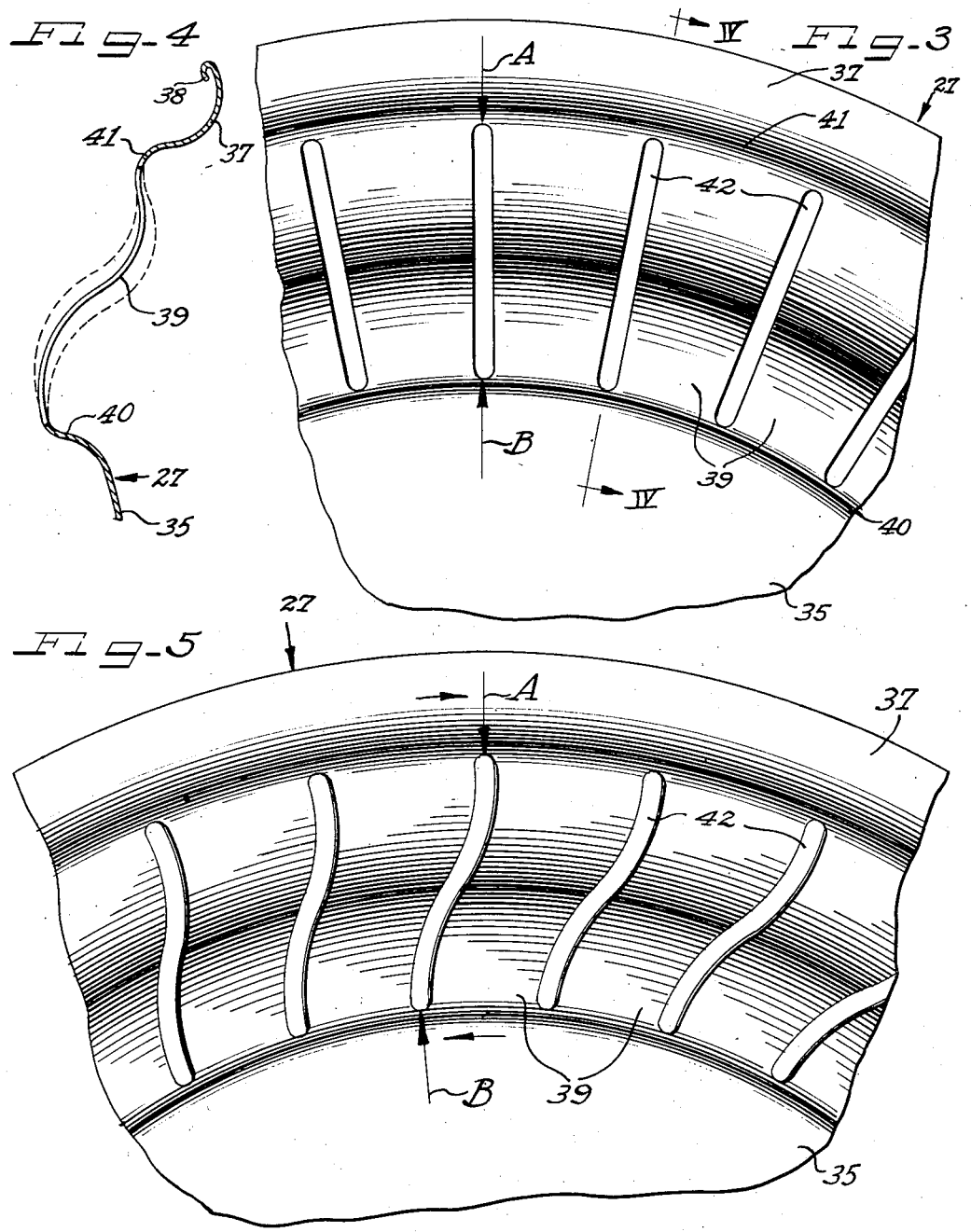

United States Patent Office 2,828,838
Patented Apr. 1, 1958

2,828,838

SHEET METAL ARTICLE WITH LOUVERS

George Albert Lyon, Detroit, Mich.

Application September 27, 1952, Serial No. 311,933

5 Claims. (Cl. 188—264)

The present invention relates to improvements in wheel structures and more particularly concerns a wheel structure having improved means for promoting circulation of brake drum cooling air therethrough and a method of making such a wheel structure.

An important object of the present invention is to provide a novel wheel structure having air circulation promoting louvers symmetrically disposed in an annular area of the structure.

Another object of the invention is to provide an improved wheel structure and cover therefor.

A further object of the invention is to provide an improved wheel cover having novel air circulation louver structure.

Still another object of the invention is to provide an improved method of making a louvered wheel structure.

Other objects, features and advantages of the present invention will be readily apparent from the following detailed description of certain preferred embodiments thereof taken in conjunction with the accompanying drawings, in which:

Figure 1 is a fragmentary radial sectional view through a wheel structure embodying features of the invention;

Figure 2 is a fragmentary radial sectional view through a modified wheel structure embodying the invention;

Figure 3 is a fragmentary outer face elevational view of a sheet metal blank showing the same in an intermediate stage in the process of making a louvered wheel structure according to the present invention;

Figure 4 is a sectional view taken substantially on the line IV—IV of Figure 3; and Figure 5 is an outer face elevational view of the blank of Figure 3 after the same has been operated upon to form the louvers thereon.

As shown on the drawings:

In one form of the invention (Figure 1) a cover assembly 10 is applied to a wheel comprising a wheel body 11 and a tire rim 12.

In the present instance the wheel body 11 may be of the disk spider type having a central bolt-on flange 13 appropriately perforated so that the wheel can be attached by means of bolts 14 to an automobile axle hub structure 15 carrying, as is usual practice, a brake drum 17. The bolt-on flange 13 is in a dished or depressed central portion of the wheel body 11 and is annularly surrounded by a generally axially outwardly projecting reinforcing rib or nose bulge 18 which slopes generally radially outwardly and axially inwardly and merges with a marginal axially inwardly extending attachment flange 19 by which the wheel body is attached in suitable manner to a base flange 20 of the tire rim 12.

The tire rim 12 may be of the usual multi-flanged drop center type for supporting a pneumatic tire and tube assembly 21. For this purpose the tire rim has, extending from the outer side of the base flange 20, a side flange 22 which merges with an intermediate generally axially outwardly extending and radially outwardly sloping flange 23. At its outer portion the tire rim 12 has a generally radially outwardly and an axially outwardly extending terminal flange 24.

At juncture of the wheel body 11 and the tire rim 12, a plurality of air circulation or ventilation openings 25 are preferably provided as by insets at appropriate intervals in the attachment flange 19 of the wheel body. Through the openings 25 air can circulate through the wheel for cooling the brake drum 17.

In the exemplary form shown, the cover 10 comprises an outer circular cover member 27 and an inner circular cover member or hub cap 28. The outer cover member 27 has a central bolt-on flange 29 generally complementary to the bolt-on flange 13 of the wheel body and in the assembly resting against the wheel body bolt-on flange and provided with registering apertures for reception of at least certain of the attachment bolts 14 by which the wheel is attached to the vehicle axle hub and by which the cover assembly is also secured to the wheel. For clearing the nose bulge 18 of the wheel body the cover member 27 has a generally axially outwardly extending flange 30 from the radially outer portion of the bolt-on flange 29. The flange 30 has adjacent to its outer margin a series of generally radially inwardly directed cover-retaining protrusions 31 which are engageable in snap-on pry-off relation by a retaining bead 32 on an underturned flange 33 of the hub cap 28. The hub cap seats at its outer margin against a rabbet groove seating shoulder 34 provided at juncture of the cover flange 30 with an outer generally radially outwardly extending and somewhat axially inwardly sloping cover body portion 35. The radially outer wall defining the seating shoulder groove 34 is defined by a pry-off rib shoulder 37 spaced a suitable distance radially outwardly from the adjacent edge portion of the hub cap 28 so that a pry-off tool such as a screwdriver can be inserted under the margin of the hub cap and levered against the pry-off rib 27 for releasing the hub cap from the retaining protrusions 31.

The cover member 27 is of a radial extent to substantially cover the tire rim 12 and for this purpose has a radially outer marginal annular portion 37 of preferably outwardly convex shape and provided with an underturned reinforcing and finishing bead flange 38 which in assembly preferably is disposed in radially inwardly spaced adjacency to the extremity of the terminal flange 24 of the tire rim.

According to the present invention the spaced annular portions 35 and 37 of the cover are of substantially relatively stiff construction in that they will resist forces tending to warp or distort the cover. To this end the cover portion 35 is of generally convex-concave shape affording it a broad annular rib formation and the outer marginal cover portion 37 due to its convex-concave shape is also of generally rib-like, relatively stiff structure.

Between and integrally connecting the cover portions 35 and 37 in one piece is a symmetrical plurality of louver-like vanes 39 disposed in an annular area of the cover bounded at the radially inner portion thereof by the cover portion 35 and at the radially outer portion thereof by the outer marginal cover portion 37. The vanes 39 are all tilted in the same direction, with the maximum tilt throughout the intermediate portions, considered lengthwise, of the vanes while the respectively opposite ends of the vanes merge into the connected portions of the cover.

It will be observed that the inner ends of the vanes 39 are connected to an annular generally axially inwardly directed adjacent portion or flange structure 40 of the cover portion 35 affording a stiffening and reinforcing juncture with the inner ends of the vanes. At their outer ends, the vanes 39 are connected to a generally radially inwardly directed narrow curved reinforcing flange 41 at the radially inner margin of the cover portion 37. Each of the vanes 39 is preferably of sinuous, generally ogee shape longitudinally. As seen in Figure 1, the vanes 39 extend generally radially and axially outwardly from the juncture with the cover flange 40, which at such juncture bottoms in assembly under resilient tension against the radially outer portion of the nose bulge 18. The vanes 39 support the marginal portion 37 of the cover in spaced relation to the tire rim 12.

It will be observed that the vanes 39 are located in an annular area opposite the wheel openings 25. In the rotation of the wheel in service, air circulation is promoted through the vanes 39 by virtue of their outwardly and inwardly tilted relationship in the cover. As a result air circulation is also promoted through the wheel openings 25 for cooling the brake drum 17.

According to the present invention the vanes 39 of the cover are provided by a novel method that I have devised. Having reference first to Figures 3 and 4, the cover member 27 is initially drawn in a sheet metal blank of appropriate gauge and material, such as stainless steel or brass having suitable working characteristics. In the pressing or drawing operations, all of the contours of the cover member 27 are provided to afford the desired profile, as preferred in the finished cover. In this, the cover body portion 35 and the reinforcing flange 40 thereof, as well as the cover marginal portion 37 and the reinforcing flange 41 thereof are completed to the arcuate, substantially stiff and rigid final form thereof.

However, the intermediate portion of the cover in which the louver-like vanes 39 are to be provided is formed of annularly continuous shape but transversely of substantially the sinuous or ogee shape generally conformable to the ogee shape of the ultimate vanes in the longitudinal direction thereof. The radially sinuous intermediate cover portion is subdivided by means of uniform narrow slots 42 into equal segments or sections from which the vanes 39 are to be formed. Although in Figure 3 the slots 42 are shown as extending radially, it is to be understood that they may be arranged in any preferred angular relation to radial such as diagonal in one rotary direction or diagonal in the opposite rotary direction cutting across the sinuous profile of the intermediate portion of the cover member 27.

After the pressing or drawing operations have been completed on the cover member 27, and it has been appropriately finished as by plating or polishing, or a combination of plating and polishing, the vane tilt is imparted to the vane sections 39. This is accomplished by the simple expedient of relatively torsionally oppositely turning the inner portion 35 of the cover member and the outer marginal portion 37 of the cover member about a common axis. Since the cover body portion 35 and its reinforcing flange 40, and the cover marginal portion 37 and its reinforcing flange 41, are relatively stiff and thus resistant to distortion, while the relatively narrow vane sections 39 are individually relatively flexible, the vane sections 39 yield during the relative rotation of the cover portions 35 and 37. The result is a uniform turning of the vane sections 39 outwardly at one side and inwardly at the other side, depending upon the direction of relative movement of the cover parts during the torsional vane tensioning and turning movement.

For more ready comprehension of the vane-forming operation, arrows A and B have been superimposed upon Figures 3 and 5. In Figure 3 the arrows are in radial alignment. This indicates the relative disposion of the cover parts 35 and 37 before the relative torsional movement thereof. In Figure 5 it will be observed that the arrows A and B are relatively offset, in the direction of the directional arrows adjacent thereto, indicating approximately the distance to which the cover portions 35 and 37 have been torsionally turned relatively for deflecting the vane portions 39.

Since the vane portions 39 are connected in one piece with the cover body portion 35 and the cover marginal portion 37 they resist the torsional movement of the two annular cover parts to which connected but are forced to yield and are thus uniformly twisted and take a set in the deflected condition to which they are forced by the relative turning of the cover parts. The amount of twisting and thereby tilting desired can be controlled by the total distance to which the cover portions 35 and 37 are torsionally rotated.

While the cover portions 35 and 37 may both be torsionally rotated simultaneously, it is more practical to hold one of the cover portions 35 or 37 stationary while the other of the cover portions is relatively turned, the end result being the same.

In Figure 4 is shown in full outline the position of the vane sections 39 before the tilting of the vanes while in dash outline is shown the tilted condition of the vanes after the annular cover portions have been relatively rotated to the limited extent desired. In Figure 1 the unstressed condition of the vanes is indicated in dash outline while the vanes are, of course, shown in full outline in their tilted service condition.

Since the intermediate portion of the cover in which the vanes 39 are formed is of sinuous transverse contour before the vanes are twisted into their tilted condition, ample material is provided for the slight elongation in the vanes that occurs during the relative turning of the cover portions. This relieves the inner cover portion 35 and the outer cover portion 37 from any substantial radial stresses that would tend to distort the same.

In Figures 1 and 5 the vanes 39 are shown as tilted at one side toward the outer side of the cover and at the other side tilted toward the inner side of the cover. In order to effect reverse tilting of the vanes, the cover portions 35 and 37 must be relatively torsionally rotated in the opposite direction to that shown by the directional arrows in Figure 5. In this way the direction of tilt of the vanes can be simply controlled merely by the direction of relative turning of the cover portions. Since the metal of the vanes takes a permanent set at the conclusion of the relative turning of the cover portions, the vanes hold their tilted relationship permanently in the cover.

In the modification of Figure 2, a one piece cover 50 is shown as applied to a wheel having a wheel body 51 and a tire rim 52. The wheel body has a bolt-on flange 53, a reinforcing nose bulge 54 and a marginal attachment flange 55. The latter flange is attached to a base flange 57 of the tire rim. Merging with the base flange of the tire rim is a side flange 58 extending to an intermediate flange 59 which in turn merges with a terminal flange 60.

In the present instance the wheel body 51 is provided with a uniform annular series of wheel openings 61 separated by integral air circulation-promoting vanes 62 in a portion of the wheel body 51 intermediate the marginal flange 55 and the nose bulge 54 and preferably including the radially outer side portion of the nose bulge. Since the nose bulge 54 substantially rigidifies the body of the wheel and the axially extending marginal flange 55 is relatively rigid, the vanes 62 can be provided in the wheel body 51 in substantially the same manner as the vanes 39 are provided in the wheel cover member 27, as hereinbefore described.

In providing the vanes 62 in the wheel body, the wheel body is initially stamped substantially completely to the contour or profile desired, but with the portion intermediate the nose bulge 54 and the marginal flange 55 of radially sinuous, preferably ogee shape in order to afford extra material for the elongation occurring in the vanes 62 as an incident to the twisting of the same during formation by relative torsional rotation of the inner and outer portions of the wheel body. As shown in Figure 2 in dash outline the original contour of the intermediate vane portion of the wheel body is in an annularly continuous form while after the relative coaxial turning or rotational twisting of the inner and outer portions of the wheel body, the vanes tilt to substantially equal opposite forward and rear sides of the original annular disposition of the vane segments. The result is a uniformly vaned wheel body which in the rotation of the wheel effects air circulation through the wheel and more especially through the wheel adjacent to juncture of the wheel body with the tire rim and thus efficiently cools the brake drum of an axle to which the wheel may be attached in similar manner as shown in Figure 1, that is by attachment of the bolt-on flange 53 to a vehicle hub having a brake drum thereon.

The cover 50 is preferably made from a single sheet of sheet metal such as stainless steel or brass and has a circular inner body portion 63 joining an annular series of symmetrically disposed and formed air circulating vanes 64 at a reinforcing juncture flange 65. At their outer ends the vanes 64 are connected by means of a reinforcing flange 67 with a marginal cover portion 68 having an underturned flange portion 69 provided with a series of generally axially inwardly extending resiliently flexible retaining fingers 70 having short and stiff engagement terminals 71 projecting generally radially and axially outwardly into cover-retaining engagement with the intermediate flange 59 of the tire rim.

The vanes 64 are formed in substantially the same manner as described for formation of the vanes 39 of the cover 10 and for formation of the vanes 62 of the wheel body 51. That is, the cover is provided with a radially sinuous or ogee shape in the portion to have the vanes 64, and the vanes are defined by separating slots 72 in the cover. Then after the cover 50 has been appropriately finished, the inner portion 63 and the marginal portion 68 of the cover are relatively torsionally rotated to deflect and set the vanes 64 in appropriately tilted condition relative to the rest of the cover.

It will be observed that the vanes 64 are generally opposite the vanes 62 of the wheel body so that in the rotation of the wheel air will be efficiently circulated through the cover and through the wheel body.

It should be noted that an important advantage attained by the present invention resides in the fact that the entire surface of the article including the portion of the article in which the louvre vanes are formed can be finished as by plating and polishing or both even before the slots dividing the vanes are cut. Thereafter, the polished vane area is free from any further die contact and thus possible marring since only the inner and outer relatively rigid portions of the article are engaged by the twisting die structure.

The method by which the respective wheel structure articles of the present invention are made is covered in my application, Serial No. 586,619, filed May 22, 1956.

It will be understood that modifications and variations may be effected without departing from the scope of the novel concepts of the present invention.

I claim as my invention:

1. In an air circulation wheel structure, a circular sheet metal body having an inner rigid portion and a radially outer marginal rigid portion in torsional displacement relative to the inner portion and with an intermediate arcuately cross-sectional portion, said intermediate portion having a spaced series of transverse slots, each sinuous in a circumferential direction, said slots being defined by twisted louvers having the edges conforming to the sinuous slots and with the ends of the louvers in torsional displacement corresponding to the torsional displacement of said inner and outer portions of the said body.

2. The air circulation wheel structure of claim 1, in which the circular metal body is a wheel body carrying a tire rim, wherein the inner rigid portion comprises a nose bulge encircling a bolt-on flange, and wherein the outer marginal rigid portion comprises an attachment flange attached to the base of the tire rim.

3. The air circulation wheel structure of claim 1, in which the circular sheet metal body comprises a trim member for disposition over the outer side of a vehicle wheel and includes means for attaching the same to the wheel.

4. The air circulation wheel structure of claim 3, wherein the means for attaching the wheel trim comprises retaining flange structure carried by the radially outer marginal rigid portion of the sheet metal body of the trim.

5. The air circulation wheel structure of claim 3, wherein the inner rigid portion carries the means for attaching the trim to the wheel.

References Cited in the file of this patent

UNITED STATES PATENTS

| | | |
|---|---|---|
| 1,730,490 | Winchester | Oct. 8, 1929 |
| 1,912,789 | Norton | June 6, 1933 |
| 1,958,484 | Lyon | May 15, 1934 |
| 1,986,836 | MacNeille | Jan. 8, 1935 |
| 2,042,754 | Winkler | June 2, 1936 |
| 2,358,984 | Lyon | Sept. 26, 1944 |
| 2,368,229 | Lyon | Jan. 30, 1945 |
| 2,441,008 | Chase | May 4, 1948 |
| 2,600,410 | Lyon | June 17, 1952 |
| 2,604,298 | Bachle | July 22, 1952 |

FOREIGN PATENTS

| | | |
|---|---|---|
| 581,308 | France | Sept. 5, 1924 |
| 458,464 | Italy | July 18, 1950 |